US012565016B2

(12) United States Patent
Umer et al.

(10) Patent No.: US 12,565,016 B2
(45) Date of Patent: Mar. 3, 2026

(54) MXene-COATED FABRIC SENSOR FOR PROCESS AND STRUCTURAL HEALTH MONITORING

(71) Applicant: Khalifa University of Science and Technology, Abu Dhabi (AE)

(72) Inventors: Rehan Umer, Abu Dhabi (AE); Muhammad Ali, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 253 days.

(21) Appl. No.: 18/311,025

(22) Filed: May 2, 2023

(65) Prior Publication Data

US 2024/0367395 A1      Nov. 7, 2024

(51) Int. Cl.
| | |
|---|---|
| *B29C 70/70* | (2006.01) |
| *B29C 70/68* | (2006.01) |
| *B29C 70/88* | (2006.01) |
| B29K 309/08 | (2006.01) |

(52) U.S. Cl.
CPC .......... *B29C 70/882* (2013.01); *B29C 70/681* (2013.01); *B29C 70/70* (2013.01); *B29K 2309/08* (2013.01); *B29K 2995/0003* (2013.01)

(58) Field of Classification Search
None
See application file for complete search history.

(56) References Cited

U.S. PATENT DOCUMENTS

| | | | |
|---|---|---|---|
| 2020/0180264 A1* | 6/2020 | Thostenson | ......... G01M 5/0033 |
| 2021/0396607 A1* | 12/2021 | Uzun | ..................... H01G 11/30 |
| 2023/0294374 A1* | 9/2023 | Bustero Martinez De Zuazo | ...... B29C 70/46 |
| | | | 264/257 |

* cited by examiner

*Primary Examiner* — Mohammad M Ameen
(74) *Attorney, Agent, or Firm* — Kilpatrick Townsend & Stockton LLP

(57) ABSTRACT

A system can include a mold for performing during a liquid composite molding process. The mold can receive a fiber material comprising a plurality of fibers, at least some fibers coated with MXene to form a fabric sensor. The system can include a sensor system for measuring piezo-resistance of the fabric sensor when the fiber material is mounted in the mold during a molding process of an item in the mold. The system can include a computing device linked to the sensor system. The computing device can include a processor and a memory. The memory can include instructions that are executable by the processor for causing the processor to: responsive to receiving a plurality of measurements of current values associated with the fabric sensor from the sensor system, determining compaction forces associated with the liquid composite molding process.

12 Claims, 10 Drawing Sheets

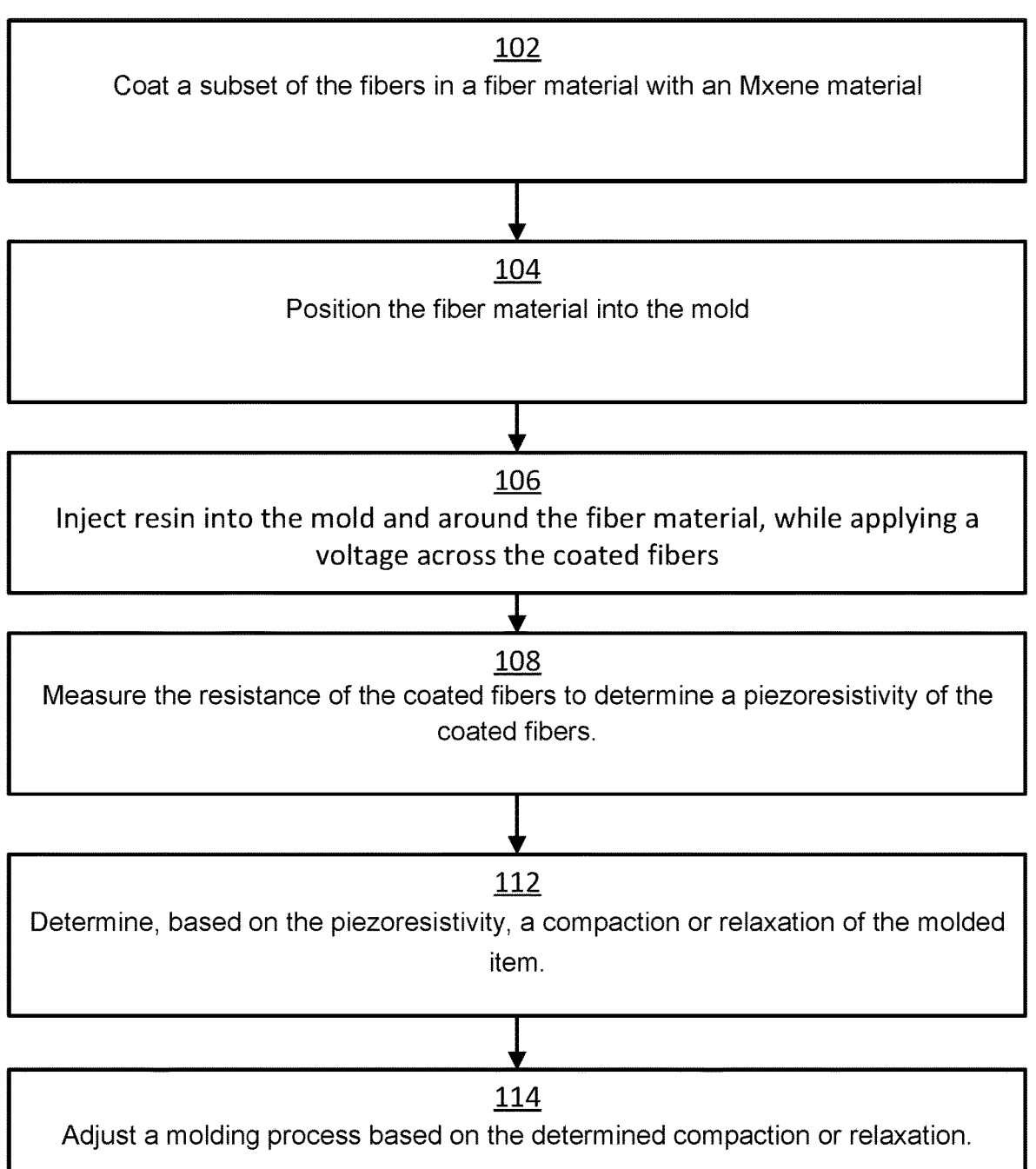

102
Coat a subset of the fibers in a fiber material with an Mxene material

104
Position the fiber material into the mold

106
Inject resin into the mold and around the fiber material, while applying a voltage across the coated fibers

108
Measure the resistance of the coated fibers to determine a piezoresistivity of the coated fibers.

112
Determine, based on the piezoresistivity, a compaction or relaxation of the molded item.

114
Adjust a molding process based on the determined compaction or relaxation.

*FIG. 1*

MXene-COATED FABRIC SENSOR FOR PROCESS AND STRUCTURAL HEALTH MONITORING

BACKGROUND OF THE INVENTION

Liquid composite molding is a process whereby a dry fibrous reinforcement is impregnated with a liquid resin within a sealed cavity. During a liquid composite molding process, the fibrous reinforcements embedded within the resin can experience through-thickness compaction forces that can affect their performance.

BRIEF SUMMARY OF THE INVENTION

A system can include a mold for performing during the liquid composite molding process. The mold can receive a fibrous reinforcement comprising a plurality of fabrics, at least some fabrics coated with MXene to form a fabric sensor. The system can include a data acquisition system for measuring piezo-resistance of the fabric sensor when the fibrous material is mounted in the mold during a molding process of an item in the mold. The system can include a computing device linked to the sensor system. The computing device can include a processor and a memory. The memory can include instructions that are executable by the processor for causing the processor to: responsive to receiving a plurality of measurements of current values associated with the fabric sensor from the sensor system, determining compaction forces associated with the liquid composite molding process.

BRIEF DESCRIPTION OF THE DRAWINGS

FIG. 1 is a flowchart of a molding process that can involve using a MXene-coated fabric sensor for monitoring the molding process.

DETAILED DESCRIPTION OF THE INVENTION

Figure 2:
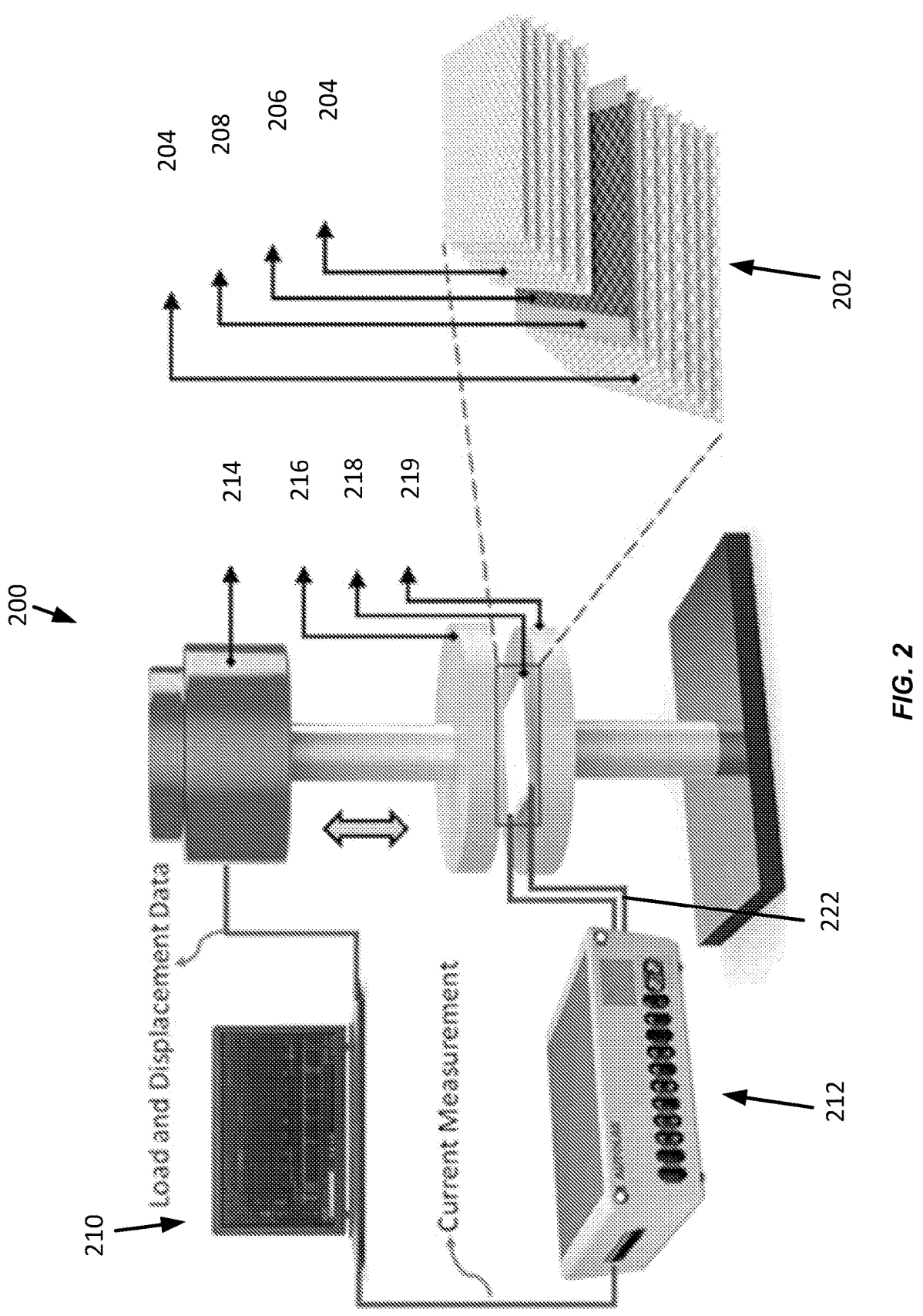
FIG. 2 is a schematic of an apparatus that includes a MXene-coated fabric sensor that can be used for determining the compaction characteristic of a fibrous reinforcement in a liquid composite molding process.

Certain aspects and features of the present disclosure relate to a MXene-coated fabric sensor. More specifically, although not exclusively, certain aspects and features of the present disclosure relate to an MXene-coated fabric sensor that can determine one or more properties associated with a liquid composite molding process. During a liquid composite molding process, dry materials, such as woven fabrics, can be positioned within a mold. The liquid composite molding process can include a resin injection process and a curing process. During the resin injection, the fibers can be impregnated with a resin. Once the resin has filled the mold, the resin can undergo the curing process that can cause the resin to harden and form a part. The fibers, now embedded within the part, can provide structural reinforcement for the part. However, the fibers can experience through-thickness compaction forces during both the resin injection process and the curing process. The through-thickness compaction forces can cause defects that can adversely affect the structural integrity of the part. Therefore, it may be desirable to monitor the through-thickness compaction forces during the liquid composite molding process and iteratively adjust parameters associated with the liquid composite molding process until acceptable compaction forces are achieved.

Turning now to the figures, FIG. 1 depicts a flowchart of a molding process that can involve using an MXene-coated fabric sensor for monitoring the molding process. Note that the steps of the process depicted in FIG. 1 may include more or fewer steps.

At block 102 of the process, a subset of the fibers in a fiber material can be coated with an MXene material. The fibers can be, for example, non-conductive glass fibers. In some examples, the fibers may be conductive fibers encapsulated with a sheath of non-conductive material such that the MXene-coated fibers are insulated from the conductive fibers by the non-conductive material. In some examples, the fibers can be woven into fabric layers. For example, the fiber material can include a stack having multiple layers of uncoated glass fibers and one layer of MXene-coated glass fibers.

At block 104 of the process, the fiber material can be positioned into the mold. The MXene-coated glass fibers can be positioned towards a middle portion of the mold. In some examples, the MXene-coated glass fibers can be sandwiched within layers of uncoated glass fibers. In some examples, the fiber material can be positioned into the mold layer-by-layer (e.g., by stacking layers individually in a vertical fashion).

At block 106 of the process, resin can be injected into the mold and around the fiber material. A voltage can be applied across the coated fibers, for example, by a power supply, a computing device, an electrochemical workstation, or any other suitable voltage source. In some examples, the MXene coated fibers can be coupled to a conductive material, such as copper tape, for measuring electrical properties associated with the MXene coated fibers. In some examples, the resin injection may be followed by a curing process, in which the resin hardens.

At block 108 of the process, the resistance of the coated fibers can be measured to determine a piezo-resistivity of the coated fibers. The resistance of the coated fibers can be measured via a voltmeter, by a computing device, or by an electrochemical workstation having a DAQ board thereon. The computing device can calculate, based on the resistance, the piezo-resistivity of the coated fibers.

At block 112 of the process, a compaction or relaxation of the molded item can be determined based on the piezo-resistivity. For example, the computing device can acquire an electrical measurement of an electrical property (e.g. current) from the coated fibers and can determine the compaction force using the electrical property. In some examples, the computing device can receive resistance measurements from the electrochemical workstation and determine, based on the resistance measurements, the compaction force associated with the coated fibers.

At block 114 of the process, the molding process can be adjusted based on the determined compaction or relaxation. For example, a parameter associated with a subsequent molding process can be adjusted by a computing device based on the determined compaction or relaxation.

FIG. 2 is a schematic of an apparatus 200 that includes an MXene-coated fabric sensor that can be used for determining a compaction characteristic of a fiber reinforcement in a liquid composite molding process. The apparatus 200 can include a stack 202 that includes one or more layers of fiber material. In some examples, the fiber material can be E-glass. Additionally, or alternatively, the fiber material can be a prepreg material. In some examples, the stack 202 can include layers of uncoated fibers 204 and a layer of coated fibers 206 that have been coated with MXene. The layer of coated fibers 206 can form a fabric sensor. The layer of coated fibers can be non-conductive glass fibers or conductive glass fibers that have been coated with a non-conductive material, such that the non-conductive material is positioned to insulate the MXene coating from the conductive interior portion of the fiber. The coated fibers 206 can have piezo-resistive properties due to the MXene coating. The coated fibers 206 can be coupled to a conductive material 208, such as one or more pieces of copper tape or any other suitable electrical contact material.

In some examples, the apparatus can include an actuator 214, such as a load cell. The actuator can be coupled to an upper platen 216 that is configured to displace downwards with respect to the actuator 214 when actuated by the actuator 214. The upper platen 216 can be positioned above a lower platen 219 that can hold the stack 202. In some examples, the upper platen 216 and lower platen 219 can join to form a mold cavity that can be used to facilitate a liquid composite molding process for forming an item.

The apparatus 200 can include an electrochemical workstation 212 that can be coupled to the coated fibers 206 via the conductive material 208. Additionally, or alternatively, the electrochemical workstation 212 can be coupled to the coated fibers 206 via one or more wires 222. The electrochemical workstation 212 can supply electricity to the coated fibers 206 for measuring electrical properties associated with the coated fibers 206. In some examples, the electrochemical workstation 212 can determine mechanical properties associated with the coated fibers 206 based on the measured electrical properties. For example, the electrochemical workstation 212 can, based on a current measurement taken from the coated fibers 206, determine a compaction force being exerted on the coated fibers 206. Additionally, or alternatively, the electrochemical workstation can determine, based on the current measurement, a compaction force being exerted on the stack 202. In some examples, the apparatus can include a computing device 210. The computing device 210 can determine one or more properties associated with the molding process. For example, the computing device can 210, based on the measurement of an electrical property associated with the coated fibers 206, determine a piezo-resistivity of the MXene coating of the coated fibers 206. Based on the piezo-resistivity, the computing device can determine a compaction force being exerted on the stack 202.

Figure 3:
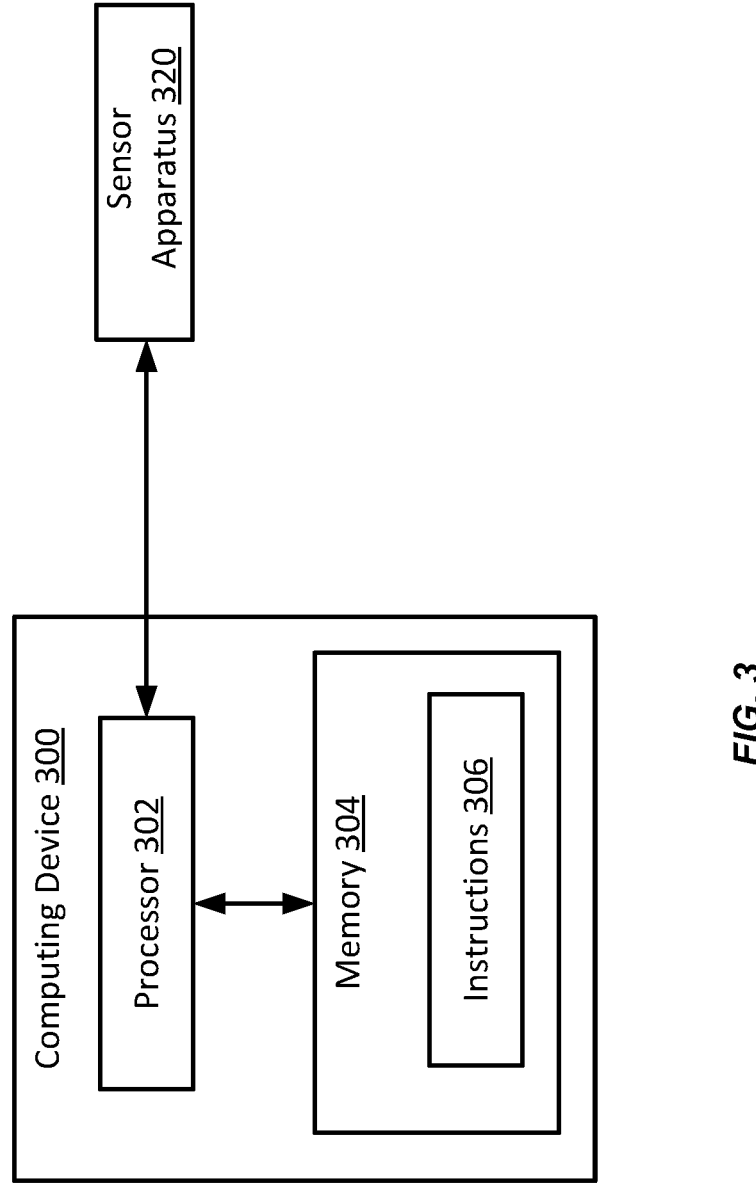
FIG. 3 is a block diagram of a computing device that can be used with a MXene-coated fabric sensor.

FIG. 3 is a block diagram of a computing device 210 that can be used with an MXene-coated fabric sensor. The computing device 210 can include a processor 302 coupled to a memory 304. The one or more processors 302 can include one processor or multiple processors. Examples of the processor 302 can include a Field-Programmable Gate Array (FPGA), an application-specific integrated circuit (ASIC), or a microprocessor. The processors 302 can execute instructions 306 stored in the memories 304 to perform one or more operations. In some examples, the instructions 306 can include processor-specific instructions generated by a compiler or an interpreter from code written in any suitable computer-programming language, such as C, C++, C#, and Java.

The memories 304 can include one memory device or multiple memory devices. The memories 304 can be volatile or non-volatile, in that the memories 304 can retain stored information when powered off. Examples of the memories 304 include electrically erasable and programmable read-only memory (EEPROM), flash memory, or any other type of non-volatile memory. At least a portion of the memory device includes a non-transitory computer-readable medium. A computer-readable medium can include electronic, optical, magnetic, or other storage devices capable of providing the processors 302 with the instructions 306 or other program code. Non-limiting examples of a computer-readable medium include magnetic disks, memory chips, ROM, random-access memory (RAM), an ASIC, a configured processor, optical storage, or any other medium from which a computer processor can read the instructions 306.

Figures 4A, 4B:
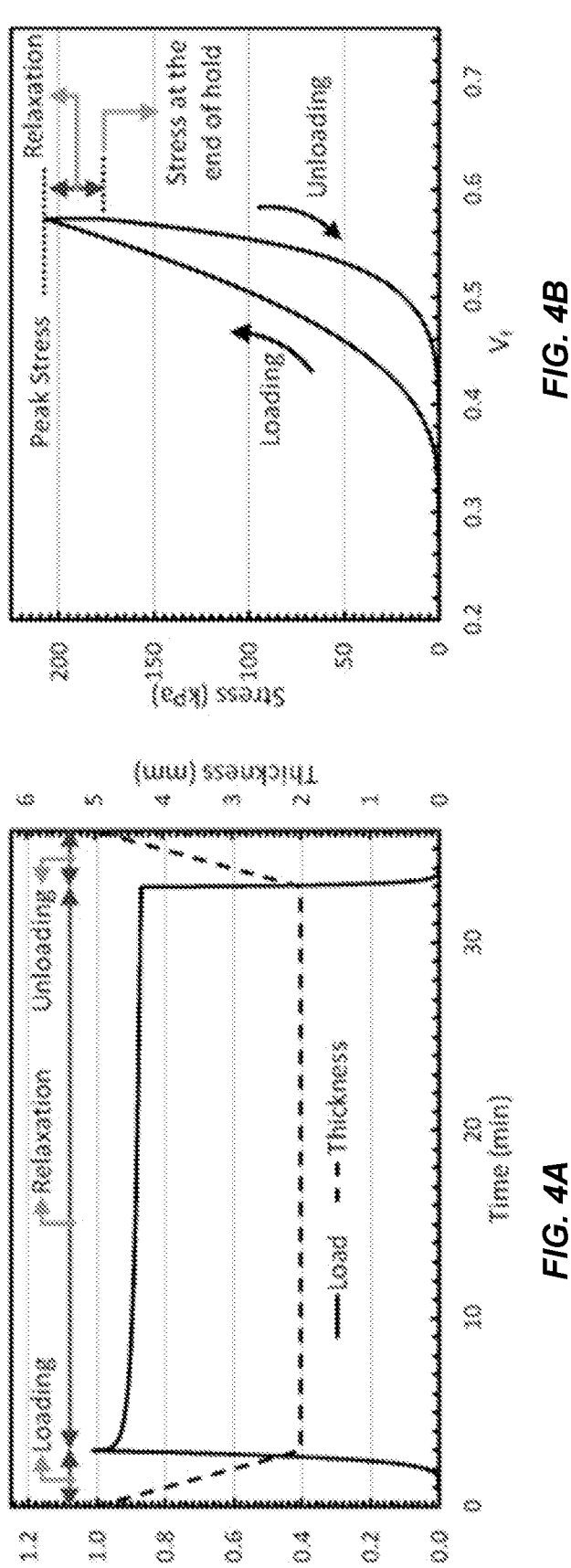
FIGS. 4A and 4B are an example of a loading profile that can be associated with a molding process.

FIGS. 4A and 4B are an example of a loading profile that can be associated with a molding process. The loading profile shows three distinct phases: a loading phase of the molding process, a relaxation phase of the molding process, and an unloading phase of the molding process. The loading profile can indicate a compaction associated with the fabric sensor or the stack in which the fabric sensor is embedded. For example, during the loading phase, the fabric sensor can experience a compaction. During the relaxation phase, the fabric sensor may experience a stress relaxation.

Figures 5A, 5B:
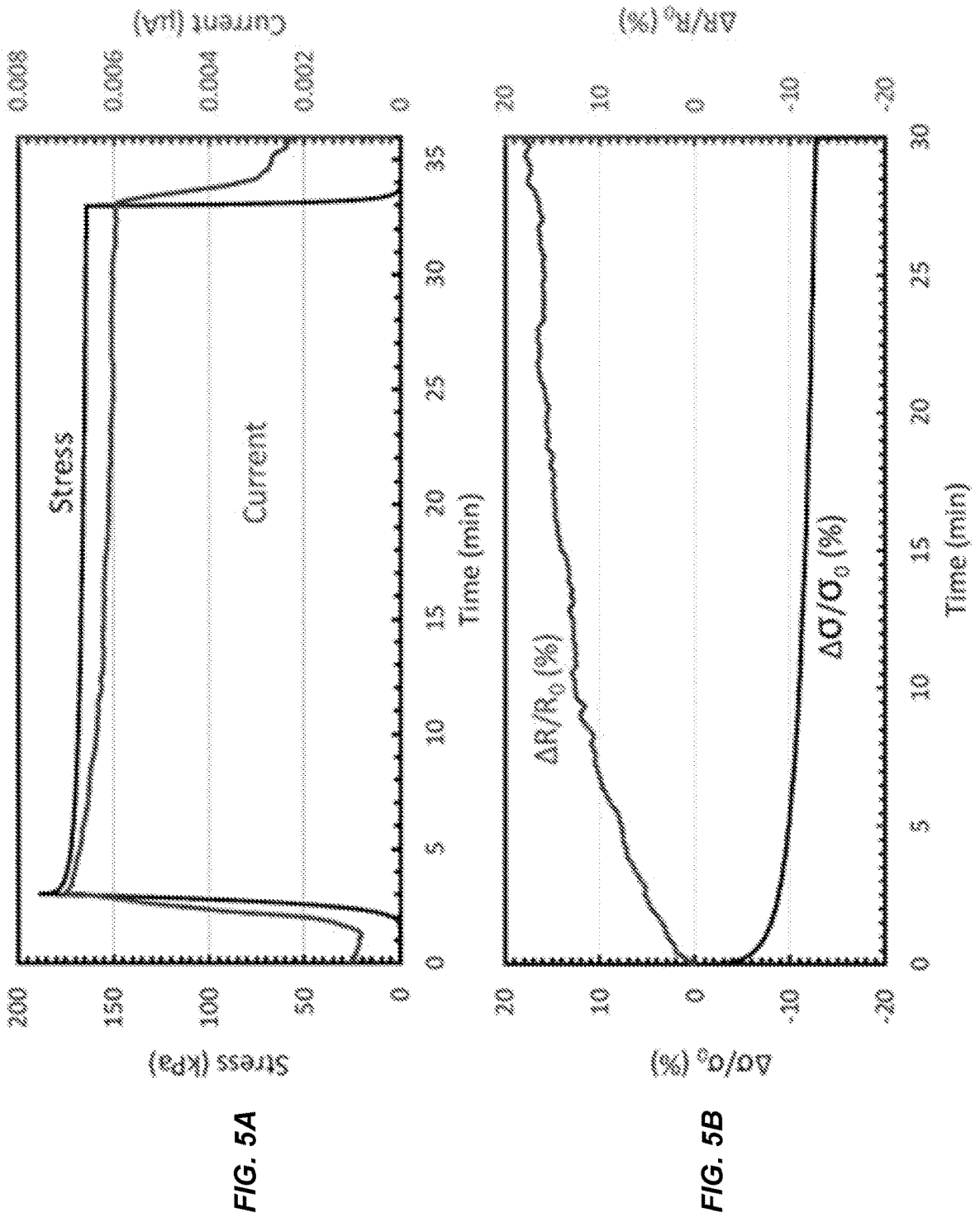
FIGS. 5A and 5B are an example of sensor data that can be produced by an MXene-coated fabric sensor in response to a loading profile.

FIGS. 5A and 5B are an example of sensor data that can be produced by an MXene-coated fabric sensor in response to a loading profile. The electrical property measured by the fabric sensor can be used to determine a mechanical property associated with the fabric sensor or the stack in which the fabric sensor is embedded.

Figures 6A, 6B:
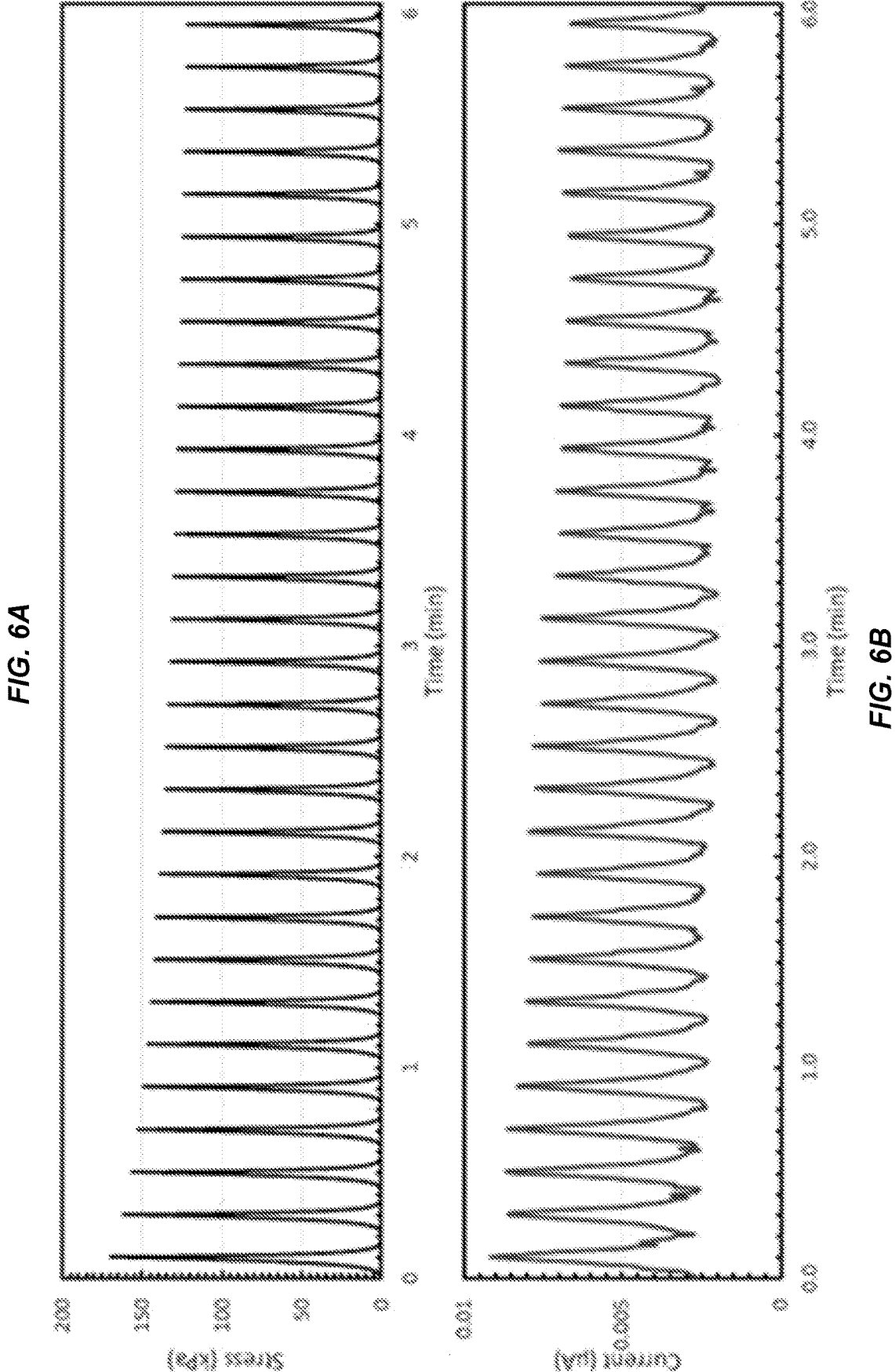
FIGS. 6A and 6B are an example of a cyclic loading profile that can be associated with a molding process and example data that can be retrieved from an MXene-coated fabric sensor experiencing the cyclic loading profile.

FIGS. 6A and 6B are an example of a cyclic loading profile that can be associated with a molding process and example data that can be retrieved from an MXene-coated fabric sensor experiencing the cyclic loading profile. The cyclic loading profile can correspond to a series of through-thickness compaction processes.

Figure 7:
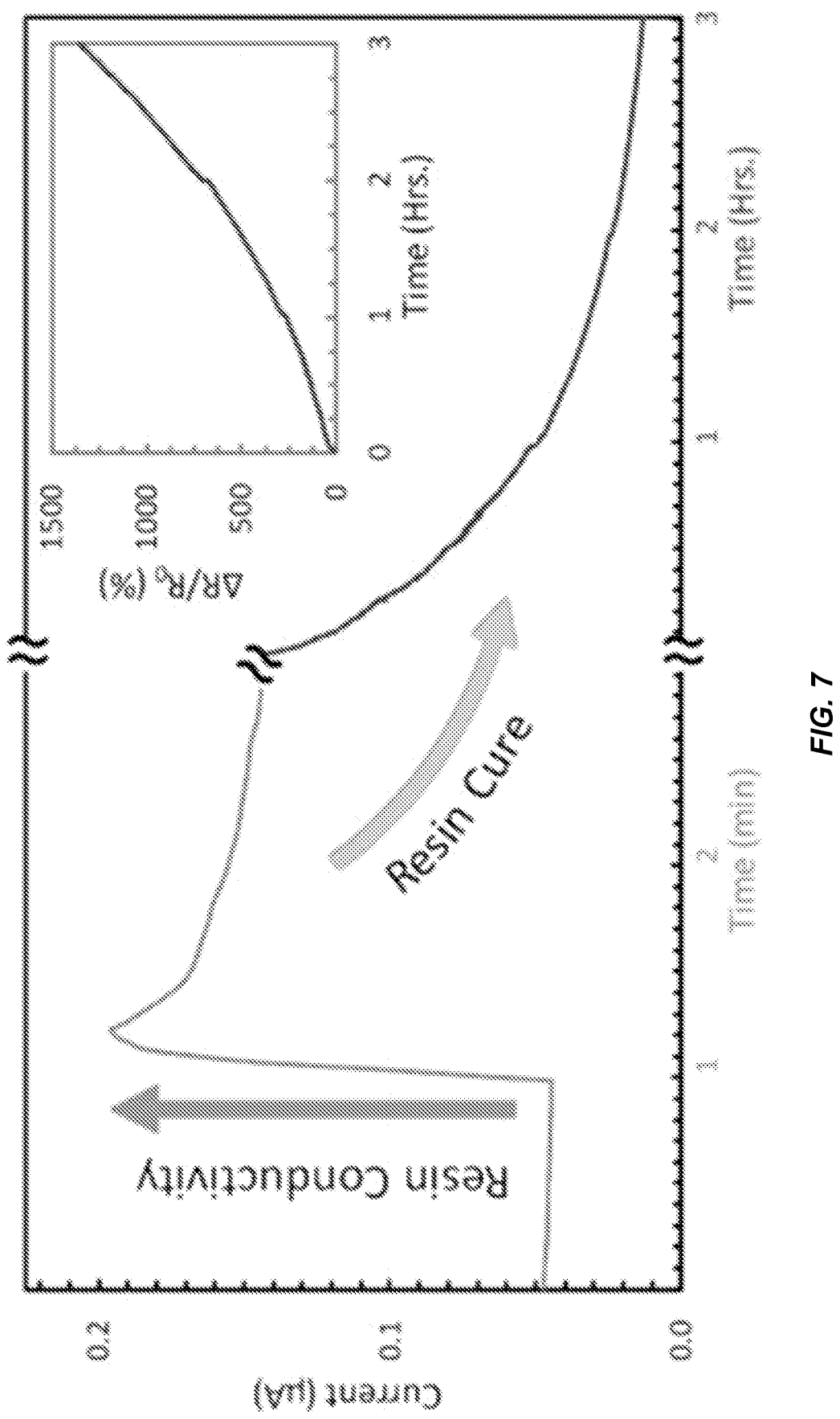
FIG. 7 is an example of sensor data that can be generated by an Mxene-coated fabric sensor during a resin curing process.

FIG. 7 is an example of sensor data that can be generated by an MXene-coated fabric sensor during a resin curing process.

Figures 8A, 8B, 8C:
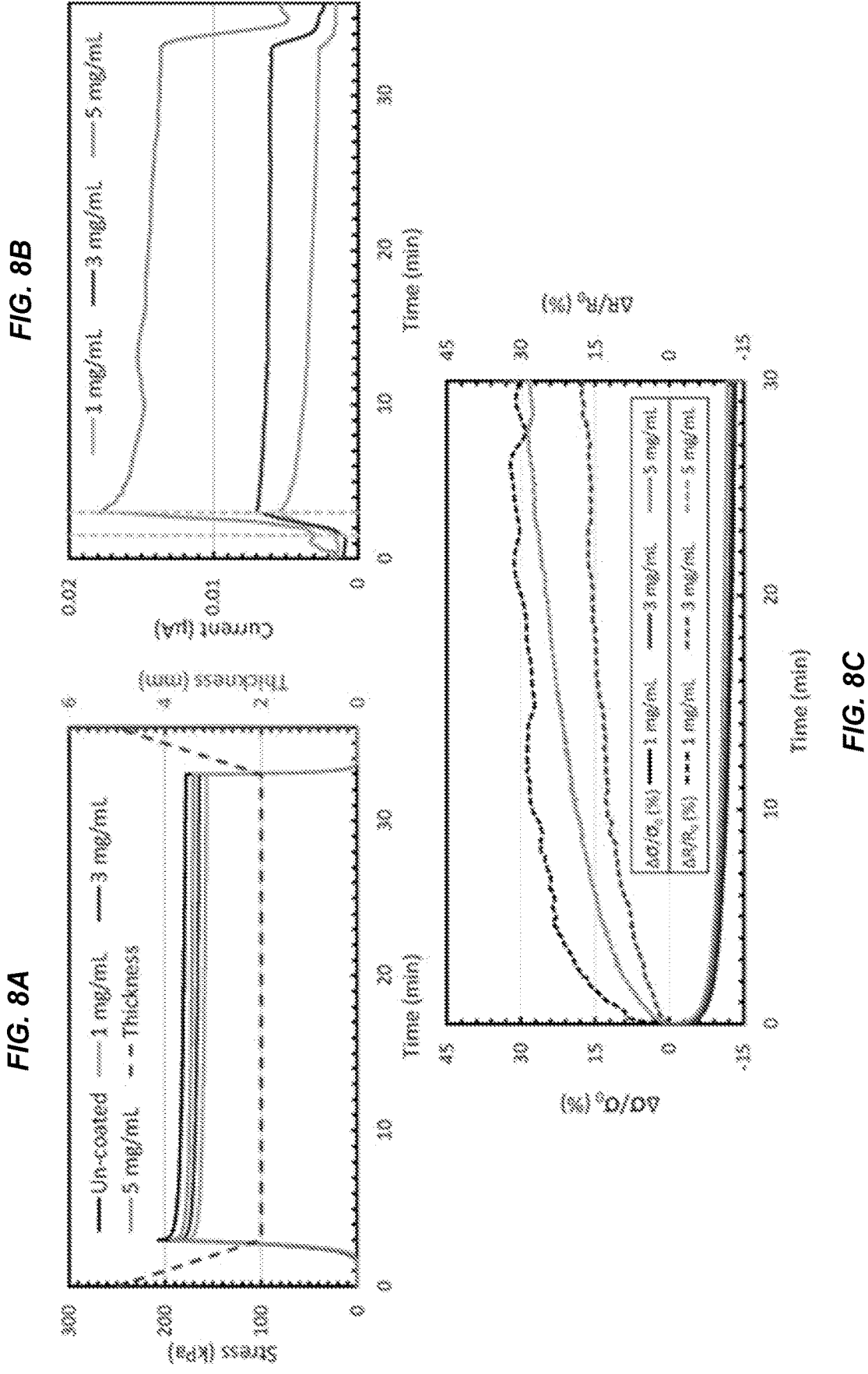
FIGS. 8A, 8B, and 8C are an example of sensor data that can be generated by MXene-coated fabric sensors containing varying concentrations of MXene in response to a loading profile.
Figures 9A, 9B, 9C, 9D:
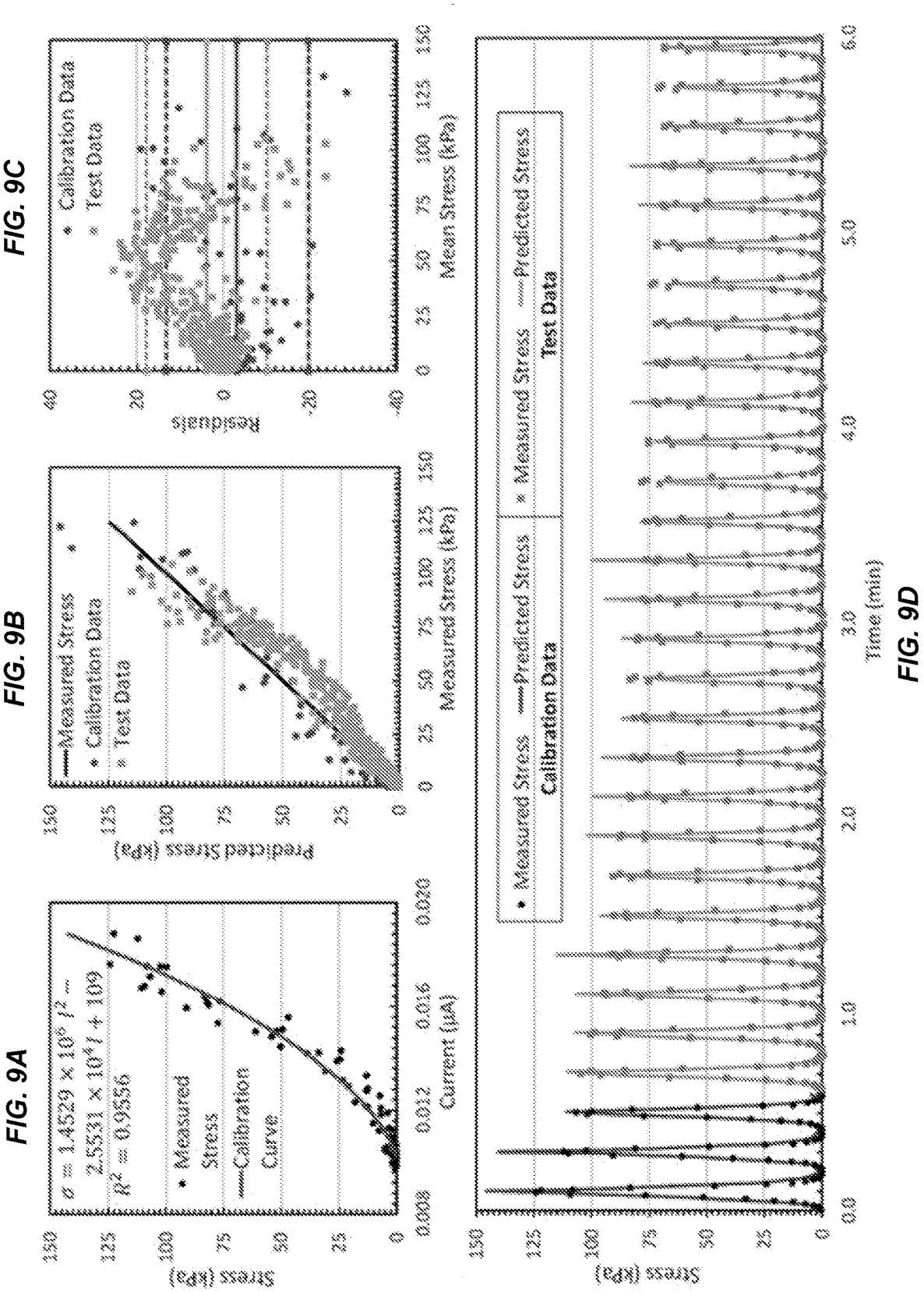
FIGS. 9A, 9B, 9C, and 9D are an example of calibration data that can be associated with an MXene-coated fabric sensor for converting the measured signal into a physical quantity.

FIG. 8A-8C are an example of sensor data that can be generated by MXene-coated fabric sensors containing varying concentrations of MXene in response to a loading profile.

FIG. 9A-9D are an example of calibration procedure that can be associated with an MXene-coated fabric sensor. The computing device can calibrate the fabric sensor to enable a user to determine a compaction force or stress relief from a measured electrical property of the fabric sensor, such as current, resistance, voltage, or any other suitable electrical property of the fabric sensor. Data can be used to calibrate the sensors by curve fitting or through one or more machine learning (ML) models. The calibration curve shown in FIG. 9A-9D can be generated using data obtained from cyclic compaction processes. The data can indicate one or more electrical measurements obtained from the fabric sensor. The calibration curve can be obtained from one or more cycles and can be validated on additional cycles. Before performing a calibration process, the signal can be filtered and the current and peak force measurements can be aligned to overcome a delay between the mechanical and electrical responses. A calibration curve can be obtained by plotting the applied stress against measured current, and fitting a polynomial to the data.

MXene-coated glass fabric sensors can obtain reinforcement compaction and stress relaxation data within a closed mold. A layer of MXene-coated sensor can be embedded within a multilayer glass fiber preform to monitor compaction forces under both dry and wet conditions i.e., when the stack is fully impregnated with resin or a test fluid. The sensors can be sensitive in both dry and impregnated states and can monitor different loading conditions such as peak stresses carried by the reinforcement, long-term stress relaxation and cyclic loads. Polynomial data fitting and machine learning models can be used to calibrate the sensors to predict the compaction response. An electro-mechanical based model, such as a traditional viscoelastic stress relaxation model, can be used to represent piezo-resistivity for long term relaxation. MXene-coated glass fabric sensors can be used for in-situ monitoring of mold clamping forces and part thickness by measuring piezo-resistive changes taking place throughout a molding cycle.

A fiber reinforcement can experience through-thickness compaction forces during manufacturing of composites via Liquid Composite Molding (LCM) processes such as Resin Transfer Molding (RTM) and Vacuum Assisted Resin Transfer Molding (VARTM). The compaction forces influence mold clamping forces and part thickness or fiber volume fraction of the composite which eventually affects overall mechanical properties of the final part. As the reinforcement thickness reduces during compaction, the permeability of the preform is also reduced, as a consequence, affecting the overall impregnation process. Hence, understanding reinforcement compaction response is vital in any composites manufacturing technique. Empirical or semi-empirical models derived from compaction tests can be expressed as power-laws. Similar knowledge about the compaction process can also be obtained from closed-form analytical models and through numerical simulations. Further details about deformations at meso- and micro-levels can be investigated by micro-CT scans. However, these can only help in designing the process and cannot intervene in real time during the manufacturing process itself.

Online and in-situ monitoring of textile compaction response can improve part quality by enabling real time strategic control over a composite manufacturing process, ensuring reproducibility and consistent part thickness. To obtain localized measurements, distributed pressure monitoring systems such as a pressure monitoring system and one or more pressure sensitive films can be used. Such systems can successfully measure pressure maps either on top or bottom of the mold surface. In some examples, nanomaterials such as graphene, carbon nanotubes, graphene nano-platelets etc. can be used as coating materials for converting reinforcing fibers into in-situ smart sensors. These nanomaterials coated sensors possess unique properties such as conductivity, piezo-resistivity, structural non-invasiveness and interfacial conformability. Based on their remarkable electrical properties, these nanomaterials can form interconnected conductive networks once deposited on the fibers. Disruptions in this conductive path arising from an external stimulus (such as force, pressure, resin flow, etc.) trigger a change in the overall electrical resistance, which can be continuously monitored and related to the physical phenomena taking place in the system.

The practical application of such sensors can be possible when we can correlate the measured signal to the applied force/stress through calibration. Usually, the calibration curve is obtained via fitting a polynomial of an appropriate order or an exponential function to the experimentally measured response (current, voltage, resistance, etc.) vs stimulus (force, stress, strain, etc.) data. Many attempts are being made to characterize and model the piezo-resistive properties.

MXenes belong to the family of two-dimensional (2D) transition metal carbides and/or nitrides, that exhibit a unique combination of electronic, optical, mechanical, catalytic, and adsorption properties. MXenes have the general formula of $M_{n+1}X_nT_x$, where M is an early transition metal (e.g., Ti, Zr, V, Mo), X is C and/or N, Tx represents the surface functional groups (e.g., $=O$, $—OH$, $—F$, $—Cl$), and n=1-4.

In some examples, MXene-coated glass fabrics can be used as sensors within layers of glass fabric preforms to capture the fabric compaction response and stress relaxation via continuously measuring the piezo-resistive response of the sensor. The technique presented here has the potential to be used as an on-line monitoring tool for a liquid composite molding (LCM) process including the resin injection and cure stages, and can easily be extended to flexible mold techniques such as VARTM and RTM-lite. Particularly, in case of the flexible mold techniques where thickness variation is a major challenge, the sensors will be able to provide real-time changes in thickness. The fabric stacks can be subjected to compaction/relaxation in dry and wet states as well as under cyclic loading. It can be shown that the MXene-coated fabrics can be used successfully for in-situ monitoring of compaction of a reinforcement. The sensitivity of the sensors can be analyzed by computing the gauge factor during compaction. The sensors can be also calibrated using quadratic polynomial and machine learning models. The piezo-resistive response during relaxation can be represented using an electro-mechanical model.

In some examples, the glass fabric can include a plain weave E-glass fabric. The glass fabric can have an areal weight of 202 g/m2. A modified-MILD process can be used to prepare Ti3C2Tx MXene from MAX-phase Ti3C2Al powder (particle size <40 μm). Other chemicals used in this work include LiF, HCl, H2SO4, and H2O2. Two types of test fluids were used in this study, a Shell Tellus hydraulic oil S2 M32 and epoxy resin mixed with slow hardener. The slow hardener available with Prime 20LV epoxy system gives a higher processing window of up to 3 h gel time, and de-molding time of 15 h at room temperature. The hydraulic oil can be used to avoid any effect of the dielectric behavior and curing of the resin on the conductivity of the coated fabric. The hydraulic oil has a viscosity of 99.6 mPa s at 23° C. [65]. The resin has a mix viscosity of 300 mPa s at 23° C.

A MXene (Ti3C2Tx) solution can be synthesized by following protocols in which Ti3AlC2 can be used as the MAX phase. In the first step, 3.80 g of LiF can be added to the 9M solution of HCl, the solution can be stirred for 5 min at room temperature. In the next step, 2 g of MAX phase powder i.e., Ti3AlC2 can be added slowly to the HCl—LiF solution over the course of 10 min, the resulting solution can be stirred continuously for 24 h at 35° C. After etching is completed, the mixture can be washed several times by using DI water to completely remove the residual acids and other reaction products, and to attain a neutral pH of 6.0. Washing can be performed by centrifuging the mixture at 5000 rpm until a pH of 6-7 is reached. The resulting suspension at pH-6 can then be washed in order to collect large Ti3AlC2 flakes. The dark supernatant containing the flakes can then be collected. The concentration of the MXene solution was measured via vacuum filtration. The final concentration can be maintained at 1, 3 and 5 mg/ml.

The glass fibers can be surface treated prior to MXene deposition. In order to improve the adhesion of the MXene on the glass fiber surface, the fibers can be chemically treated and subjected to oxygen plasma treatment to remove any organic contaminations through a chemical reaction or physical ablation. The as-received glass fibers were heat treated in a box furnace at 600° C. for 1 h to get rid of any residues of sizing present on the fibers during the commercial manufacturing process. The heat treatment can be followed by treating the fibers in 3:1 wt ratio of sulphuric acid (H2SO4) and hydrogen peroxide (H2O2) solution (Piranha) for 10 min. The resulting chemically treated glass fibers were washed with DI water several times until a neutral pH is achieved. Finally, the glass fibers can be exposed to oxygen plasma treatment for 5 min at 29.6 W by using a plasma cleaner.

The solution coating technique can be used to coat MXene on the glass fabric. To coat MXene on glass fibers, 20 ml of MXene solution can be poured in a glass container, the treated glass fiber samples can be dipped inside the solution and left overnight. The samples were taken out and air dried at room temperature for 8-10 h. Scanning electron microscopy (SEM) (FEI Quanta 250 FEG-SEM microscope) can be used to investigate the coating quality of the fabric sensors. As expected, it can be seen in the SEM images that the quantity of deposition increased at higher MXene solution concentration as evident by large flakes of MXene.

The compaction and stress relaxation tests were carried out following the procedures suggested by the international compaction benchmark for both dry and wet reinforcements. The compaction experiments can be performed in an Instron 5969 universal testing machine with a 2 kN load cell capacity. An electrochemical workstation with a DAQ system can be used to continuously record the electrical current while maintaining a constant voltage of 5V. The current-voltage data can be converted into electrical resistance using Ohm's law. Square samples of dimensions 70×70 mm^ can be cut and stacked into 14 layers. The MXene-coated layer with attached connections for electrical resistance measurements can be sandwiched between the uncoated layers (15 layers in total). Copper wires can be connected to the ends of the fabric sensors using an adhesive copper tape for measuring the resistance changes. The connections can be installed such that they did not interfere the compaction and stress relaxation process. Prior to the compaction experiments, the test samples can be weighed using an electronic balance. The measured weight and theoretical volume of the reinforcements' stack can be used to estimate the fiber weight and volume fraction.

The fabrics can be compacted at a rate of 1 mm/min to a target thickness of 2 mm (corresponding to approximately Vf=0.55). A constant target thickness can be selected as compared to a target fiber volume fraction as it can be difficult to accurately control the fiber volume fraction of the cut fabric layers. Once the target thickness of 2 mm can be achieved, the thickness can be held constant for 30 min and released with the same rate (1 mm/min). The loading and unloading profile for this test is shown in FIG. 3. In a separate set of experiments, a cyclic compaction force was applied to the reinforcement stack to study the stability of the piezo-resistive response. A total number of 30 cycles can be applied by controlling the thickness between 3 mm and 2 mm with a rate of 10 mm/min.

For the wet experiments, all the layers (including the coated layer) of the test samples can be soaked thoroughly in the test fluids. The hydraulic oil and resin mixed with the slow hardener can be used as test fluids in two separate compaction experiments. After weighing the dry samples, the stack was split into two from the middle and the coated fabric was removed. The test fluid was poured carefully over each stack using a pipette and was spread with a small roller. The two stacks can be then put together with the coated fabric in the middle. The compaction and stress relaxation experiments can be performed using the MXene-coated fabric performing as piezo-resistive sensor. Prior to compaction experiments, each stack can be weighed and fiber volume fraction can be calculated based on 2 mm target thickness. The marginal differences in the weights can be attributed to human error during cutting of the fabrics. The measured weight was used to calculate the final fiber volume fraction achieved during compaction.

The applied load and displacement of the upper platen and the current passing through the coated fabric can be continuously recorded. The MXene-coated fabric sensors can detect compaction and stress relaxation taking place within the reinforcements during the application of the load. The stress and current profiles can be plotted as a function of time using a sensor with MXene concentration of 3 mg/mL. The measured current profile can mimic the stress profile with three distinct phases, (1) loading, (2) relaxation and (3) unloading. After reaching a thickness of 2 mm, the upper platen was held at this position and the preform was allowed to relax for 30 min. Note that the lower platen was stationary during all experiments reported in this study. During stress relaxation, as the load gradually decreases, the resistance starts to increase. The relative changes in stress and resistance are mirrored in the x-axis. Note that the reference values σ0 and R0 correspond to peak stress values. The final stress is around 15% of the peak value. Similarly, there is approximately 15-30% relative change in resistance. This is a very significant finding as it shows that the phenomena of stress relaxation in fabrics placed within a closed mold, such as in the case of RTM, can be monitored online using MXene coated in-situ fabric sensors, which otherwise is extremely challenging to monitor. No such study has been reported so far according to our knowledge which focuses on in-situ monitoring of stress relaxation using nanomaterial sensors.

The preform was subjected to cyclic load in order to investigate the permanent deformation in the reinforcement and overall stability of piezo-resistive response over a number of compaction cycles on MXene-coated fabric sensors. The response of the sensors was found to be stable during cyclic compaction. The value of current can drop slightly in each cycle which coincides with the drop in the peak stresses, showing permanent deformation in the preform when compressed to the target thickness of 2 mm. The results show that the MXene-coated glass fabric provides a very stable response against the applied load and is very sensitive in monitoring the changes in the compaction forces applied to the reinforcements in the mold.

The sensor performance was also investigated when the reinforcement stack was compacted under saturated condition. In the first set of experiments, the reinforcement was saturated with the test fluid oil. Here, 3 mg/mL MXene coated fabrics can be used as sensors. The peak stress achieved was approximately 60 kPa, which is significantly lower as compared to the dry preform (~180 kPa). As was the case for dry fabrics, the MXene-coated fabrics showed a very good response to the applied load-relaxation-unloading profile for the oil impregnated preforms. In some examples, the relative changes in the stress and resistance during relaxation for oil-impregnated fabrics can mirror each other in shape and extent of change.

In the final set of experiments, the preforms can be impregnated with epoxy resin mixed with a slow hardener. The wet preform can be subjected to a compaction loading profile. It should be noted that the oil offers more lubrication effect as compared to the resin system (peak stress ~140 kPa), which showed a peak stress of around 60 kPa under similar compaction loading condition, however, still lower than dry compaction (~180 kPa). During the compaction of resin-impregnated samples, the role of resin conductivity, gelation and cure, and the possible interaction of resin with MXene also needs to be accounted for, since these aspects also affect piezo-resistive response of the sensors. Unlike dry and oil-impregnated preform compaction, it can be seen that the corresponding piezo-resistive response against compaction profile is opposite of what was reported in previous sections of dry and oil impregnated preforms. This suggests that the resin conductivity has played a vital role initially followed by its cure kinetics. It can be clearly seen that the initial value of the current (~0.01 μA in FIG. 7) is relatively higher as compared to the dry preform. The initial increase in the current (due to conductivity) is supported by dielectric nature of epoxy resin. This is similar to the effect on the piezo-resistive response of reduced graphene oxide (rGO) reported in Ref. [32]. Once the resin starts curing, an insulating influence on the coated fabrics is seen while the resistance starts to increase. This is the reason that the current keeps dropping from the beginning of the compaction, which can then be further accelerated by the compressive load as shown. The compaction process squeezes the curing resin into the conductive paths established during the coating process and hence the conductivity of the coated fabrics drops more rapidly. Regardless of the increase or decrease in conductivity, the sensor signals provide valuable insights about the process in real time.

A comparison of the current profiles for the dry, oil-impregnated and resin-impregnated fabrics under the same conditions. Here, it can be seen that the trends are similar for both dry and oil-impregnated fabrics for compaction-stress relaxation-unloading sections. However, the response for resin impregnated fabrics has three noticeable differences: (1) at the start of compaction, the current is high as compared to dry/oil impregnated fabrics, (2) in compaction phase, the current is decreasing; and (3) the rate of change in current is very high during stress relaxation. These differences are related to resin conductivity, gelation and cure, and possible interaction of the resin with MXene.

The response during the relaxation phase of wet compaction with the resin shows a decreasing trend similar to the dry compaction. However, a close observation reveals that the relative change in resistance of resin-impregnated preforms can be much higher (~500%) than that of dry preforms (~15%) or oil-impregnated preforms (~15%). This is because the resin can be mixed with the hardener and cross-linking may have already started. It is difficult to establish the distinction between increase in resistance purely due to stress relaxation and resin curing. However, looking at the previous results with dry and oil-impregnated preforms, it can be established that the nature of the resin and curing process is primarily controlling any changes in resistance during stress relaxation phase.

To further investigate the effects of dielectric nature of the epoxy resin on the response of the coated fabric sensors, a simple experiment was conducted where epoxy-hardener mixture was poured over a coated fabric sensor, and the current was measured continuously using the DAQ system onboard the electrochemical work station. A strip of the coated fabric sensor can be placed in a Petri dish with alligator clamps connected at the ends. The current can be measured continuously for 1 min and then the epoxy-hardener mixture was poured over the strip carefully. The conductivity of the strip sharply increased upon coming in contact with the mixture. This clearly indicates that the mixture indeed imparts conductivity to the sensors, and this is the reason that the current started with a higher value. However, once the current reaches to a peak value, the current drops in an exponential manner.

The effect of MXene concentration on overall response of fabrics in dry and impregnated states can also be investigated. Three concentrations can be selected for these studies as mentioned before i.e., 1, 3 and 5 mg/mL. The overall resistance of the conductive networks formed by nanomaterials can be divided into three types: (i) intrinsic resistance of nanomaterials (Ri), (ii) contact resistance (Rc), and (iii) tunneling/hopping resistance (Rt). It is well-known that there is an optimal range of nanomaterials' concentration where the sensors show better sensitivity for a particular physical phenomenon. As described earlier, the piezo-resistive changes taking place in the coated fabric as a result of external forces is linked with changes in electrical resistance of the fabric.

For all concentrations, the trends in the resistance change as a result of compaction and stress relaxation can be similar, however, the quantitative values can be different, as expected. The response of the MXene-based sensors is different during the compaction, relaxation and unloading phases. An increase in the current flowing through the sensor with an increase in MXene concentration can be observed. However, in these types of piezo-resistive sensors, instead of an absolute value of resistance, the relative change in resistance should be taken. A lower resistance doesn't necessarily mean that the sensor performance would be superior and an optimal concentration is always required. It can be seen that all three concentrations can provide meaningful data under the experimental conditions described in this application. During practical application of these sensors, for a different set of conditions, such as, part thickness, applied clamping forces etc. the user can use an optimum coating concentration for the application.

The overall piezo-resistive response of the coated fabric sensor can be divided into compaction and relaxation induced piezo-resistivity. In the compaction phase, the thickness evolution is the driving parameter for piezo-resistivity, whilst the only measurable change within the relaxation phase is the drop in force. Here, we have discussed these two phases and linked the piezo-resistivity to the relative change in thickness/stress in compaction/relaxation phases respectively. We have also developed and discussed calibration models for predicting the applied stress from the measured current.

The piezo-resistive behavior can be generally described by a Gauge Factor (GF), which is defined as relative or fractional change in resistance per unit change in the strain. The GF is a quantitative measure of sensitivity of piezo-resistive sensors. Here, the GF has been calculated as the slope of the linear curve fitted to the $\Delta R/R0$ vs. $\Delta h/h0$ measurements. As discussed previously, the compaction response during dry compaction can be divided into two linear phases. The first phase is rapid and most of the changes occur during this phase, as indicated by the high GF for this phase. The response flattens in the second phase. This dichotomy cannot be seen in the wet compaction as only one section can be seen. There is no significant change in the first phase. This can be related to the consolidation of the wet preform stack before compaction where, the upper platen touches the preform at much smaller thickness than the dry stack. Also, the response of impregnated fabrics indicates lubricating effect of the oil.

The calibration of the sensors can enable a user to predict the applied force/stress from the measured signal (current/ resistance/voltage etc.). Experimental measurements can be used to calibrate the sensors by curve fitting or through advance machine learning (ML) models. Here, the calibration curve and ML models have been developed using the data from cyclic compaction experiments only. The calibration curve was obtained from first three cycles and validated on the remaining cycles. Before performing calibration, the signal was filtered and the current and peak force measurements can be aligned to overcome the delay in the mechanical and electrical responses. The application to the 5 mg/mL MXene concentration is discussed here, however, it can be easily extended to all other cases.

The calibration curve was obtained by plotting the applied stress against measured current, and fitting a polynomial of second order to the experimental data. The equation of the curve for predicting the applied stress is given as;

$$\sigma = 1.4529 \times 10^{\wedge}6 \times I^{\wedge}2 - 2.5531 \times 10^{\wedge}4 \times I + 109 \tag{2}$$

where $\sigma$ is the applied stress (kPa) and I is the measure current ($\mu$A).

The conventional or parametric regression models can have a fixed functional form and limited number of parameters. On the other hand, machine learning models may be nonparametric (i.e. not limited by a functional form) with theoretically a finite number of parameters. Hence, machine learning models are more capable of recognizing hidden patterns and capturing the variability within the data. Support Vector Regression (SVR) and Gaussian Process Regression (GPR) are examples of widely used machine learning algorithms for regression tasks. Both these models are considered nonparametric techniques because they rely on kernel functions. SVR is one of the most robust prediction methods, being based on statistical learning frame works that tries to fit the best line/hyperplane to the available data within a threshold value. GPR models are nonparametric kernel-based probabilistic models that can infer a probability distribution over all possible values, rather than the exact values for every parameter in the functions. GPR has several benefits, working well on small datasets and having the ability to provide uncertainty measurements on the predictions. The SVR and GPR machine learning models can be implemented and trained using MATLAB® Statistics and Machine Learning Toolbox. The SVR model was implemented with a Gaussian kernel, and the sequential minimal optimization (SMO) algorithm was used for its training. Similarly, the GPR model was implemented with a squared-exponential kernel and the quasi-Newton algorithm was used for its training.

Both the SVM (R2 0.96 and RMSE 7.54) and GP (R2 0.97 and RMSE 6.93) produced more accurate results than the polynomial fitting as shown in the previous section. The experimentally measured values fall within the 95% confidence intervals of the GPR model. The 95% confidence intervals appear to be wider at low stress values indicating that there is significant fluctuation at these low stress values. This is understandable as the sensor's response is noisy at these loads. Similar observations can be made about the GPR model predictions of the test data.

The glass fabrics can have viscoelastic behavior in compaction that entails significant stress relaxation under constant thickness. As seen in the experiments, the resistance of the coated fabric also varies during this stage. This phenomenon has also been observed in fabric sensors with carbon-based coatings and discussed in literature as "resistance relaxation". The phenomenon of "resistance relaxation" or "relaxation-induced piezo-resistivity" is time dependent and essentially induced by the time-variant local stress field through changing the spatial distribution of conductive paths in the coated fabric. The resistance relaxation can be given as:

$$(\Delta R(t))/R\_0 = a + be^{\wedge}\alpha t + ct \tag{3}$$

where a, b, c and $\alpha$ are the model coefficients to be determined from experimental data, and t is the elapsed time (in minutes). This model proposes that the time evolution of the fractional change in electrical resistance of the material is a function of three components, viz. an immediate elastic change of resistance (first constant term, a), an exponential viscoelastic change of magnitude b, which is dominated by the exponential behavior of the relaxation time ($\tau=1/\alpha$), and finally a permanent (linearly increasing) change of time-dependent resistance (with fitting constant c). The analogous model for the stress relaxation as a function of elapsed time can be given as:

$$(\Delta\sigma(t))/\sigma\_0 = a + be^{\wedge}\alpha t + ct \tag{4}$$

The compaction and stress relaxation experiments can be performed with dry, oil-impregnated and resin-impregnated fabrics. The MXene-coated glass fabric sensors can be embedded within the reinforcement stack and the changes in electrical resistance during compaction can be monitored online using a DAQ system. The compaction response in terms of piezo-resistivity change for dry and oil-impregnated fabrics was similar whereas, due to the dielectric nature and cure kinetics of the resin, the compaction response with resin-impregnated fabrics was different where initially, the sensors reported high conductivity due to epoxy resin and MXene interactions. However, once cross-linking starts, the conductivity can decrease (resistance increased) as the resin starts to cure. The relaxation behavior in all cases may show similar trends, however, the quantitative values of resin-impregnated fabrics can be significantly higher due the influence of resin in the piezo-resistive response of the sensors. The effect of MXene concentration on the sensing behavior was also evaluated, it was shown that the concentration had little effect on the sensitivity of the sensors within the parameters used in this study.

The sensitivity of the sensors during compaction phase can be determined by computing the gauge factor. Finally, the sensors can be calibrated via polynomial data fitting and machine learning models. The relaxation induced piezo-resistivity was characterized using analytical electrome-chanical models. It was demonstrated that the proposed smart in situ sensors could be used to obtain useful data related to mold clamping forces and part thickness evolution within a closed molding process. The current method can be used for non-conductive fabrics. However, it can be easily extended to conductive fabrics by using hybrid laminates. In a hybrid laminate, a non-conductive coated fabric should be embedded and well insulated from the conductive layers.

Figure 10:
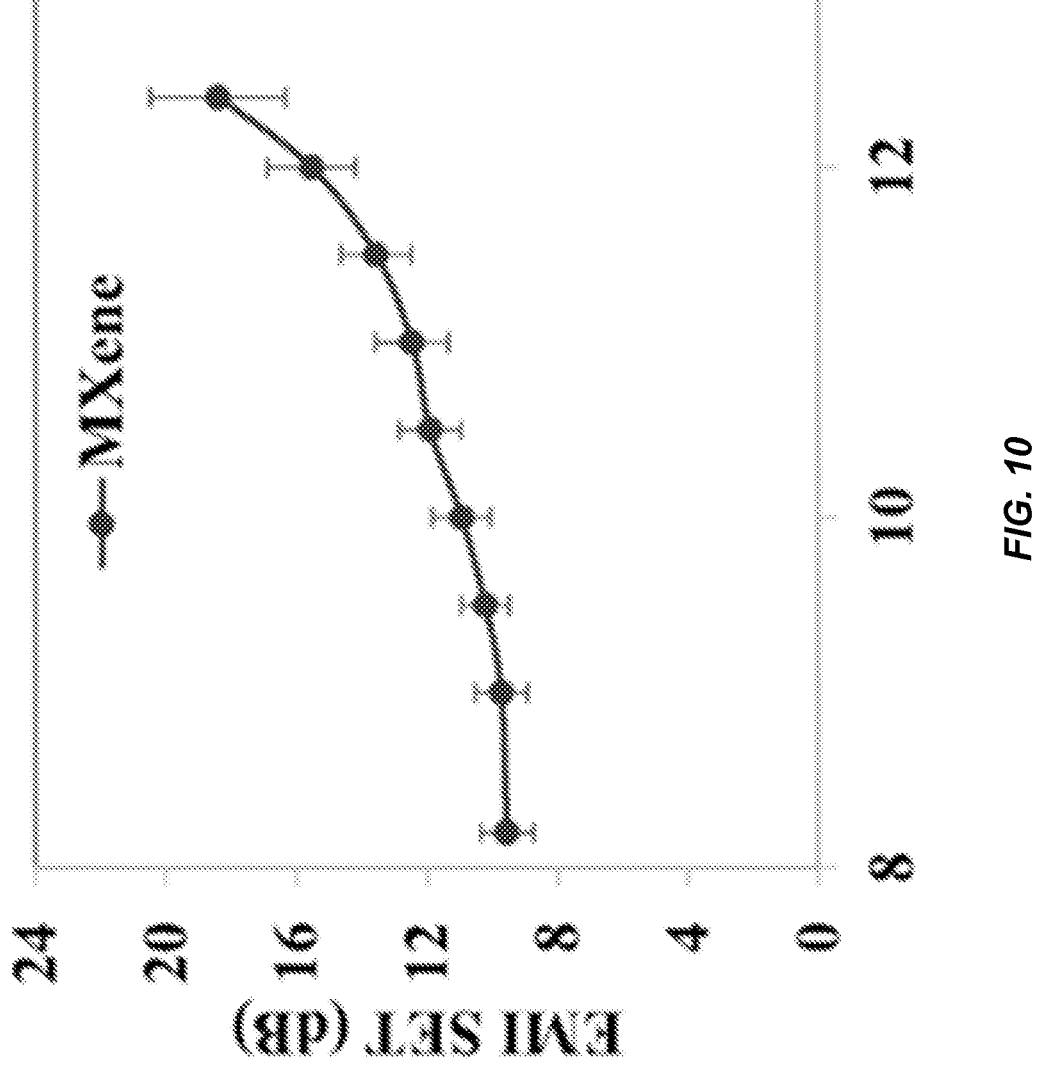
FIG. 10 is an exemplary graph depicting the EMI shielding effectiveness of an MXene-coated fabric sensor versus frequency of incoming EMI according to some aspects of the present disclosure.

In certain examples, it may be desirable to protect an electronic component from environmental electromagnetic interference. MXene-coated fabric materials can include electromagnetic interference (EMI) shielding capabilities and can be positioned around electronic components to protect the electronic components from electromagnetic interference. More specifically, MXene-coated fabric mate-rials can absorb or reflect electromagnetic interference that may be incoming with respect to the electronic components, thereby decreasing the amount of electromagnetic interfer-ence experienced by the electronic components. The EMI shielding effectiveness of an MXene-coated fabric material can depend on the concentration of MXene coating the fabric material and can be tuned to match a desired value. Additionally or alternatively, the shielding effectiveness of the MXene-coated fabric material can be tuned by adjusting the number of MXene-coated layers in the MXene-coated fabric material. In some examples, an MXene-coated fabric material can have a high electrical conductivity that can prevent electromagnetic interference from penetrating through the thickness of the MXene-coated fabric material. FIG. 10 shows an exemplary graph depicting the EMI shielding effectiveness of an MXene-coated fabric sensor versus frequency of incoming EMI. The x-axis corresponds to the frequency of incoming electromagnetic interference (in GHz) and the y-axis corresponds to the total shielding effectiveness of an MXene-coated fabric material (in dB of attenuation). The total shielding effectiveness can be calcu-lated by adding the amount of shielding effectiveness of the MXene-coated fabric sensor due to absorption to an amount of shielding effectiveness of the MXene-coated fabric sensor due to reflection. The graph shows increased attenuation at higher EMI frequencies.

In the preceding description, various embodiments have been described. For purposes of explanation, specific con-figurations and details have been set forth in order to provide a thorough understanding of the embodiments. However, it will also be apparent to one skilled in the art that the embodiments may be practiced without the specific details. Furthermore, well-known features may have been omitted or simplified in order not to obscure the embodiment being described.

Some embodiments of the present disclosure include a system including one or more data processors. In some embodiments, the system includes a non-transitory com-puter readable storage medium containing instructions which, when executed on the one or more data processors, cause the one or more data processors to perform part or all of one or more methods and/or part or all of one or more processes and workflows disclosed herein. Some embodi-ments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifi-cally disclosed by embodiments and optional features, modi-fication and variation of the concepts herein disclosed may be resorted to by those skilled in the art, and that such modifications and variations are considered to be within the scope of this invention as defined by the appended claims.

The description provides preferred exemplary embodi-ments only, and is not intended to limit the scope, applica-bility or configuration of the disclosure. Rather, the ensuing description of the preferred exemplary embodiments will provide those skilled in the art with an enabling description for implementing various embodiments. It is understood that various changes may be made in the function and arrange-ment of elements without departing from the spirit and scope as set forth in the appended claims.

Specific details are given in the description to provide a thorough understanding of the embodiments. However, it will be understood that the embodiments may be practiced without these specific details. For example, specific com-putational models, systems, networks, processes, and other components may be shown as components in block diagram form in order not to obscure the embodiments in unneces-sary detail. In other instances, well-known circuits, pro-cesses, algorithms, structures, and techniques may be shown without unnecessary detail in order to avoid obscuring the embodiments.

What is claimed is:

1. A method comprising:
positioning a fiber material including a fabric sensor in a mold, the fabric sensor including a fiber material com-prising a plurality of fibers and including a MXene applied to a subset of the fibers embedded in the plurality of fibers of the fiber material so that the subset of the fibers has piezoelectric properties; and
during liquid molding of an item in the mold with the fiber material in place in the mold, sensing a current of the fabric sensor; determining a property of the item in the mold based upon the current.

2. The method of claim 1, further comprising positioning the fabric sensor towards a middle of the item.

3. The method of claim 2, further comprising adjusting a parameter associated with a molding process of the item based on the determined property.

4. The method of claim 3, further comprising adjusting a parameter associated with a subsequent molding process of a subsequent item based on the determined property asso-ciated with the item.

5. The method of claim 4, wherein the fabric sensor is coupled to an electrochemical workstation with a DAQ system that is configured to obtain measurements from the fabric sensor and transmit the measurements to a computing device.

6. The method of claim 5, wherein the mold comprises:
an upper platen that is configured to press downward with respect to the fiber material and provide a downward force to the fiber material; and a lower platen that is configured to be held stationary with respect to the fiber material and provide an upward force to the fiber material.

7. The method of claim 6, wherein the fiber material includes a plurality of layers of plain weave E-glass fabric.

8. The method of claim 7, further comprising positioning the fabric sensor so that it is distanced from the upper platen and the lower platen.

9. The method of claim 8, wherein the property includes a compaction force experienced during the molding process.

10. The method of claim 9, wherein the MXene is electrically conductive and is configured to provide the fiber material with electromagnetic interference shielding capabilities.

11. The method of claim 1, wherein the subset of the fibers embedded in the plurality of fibers of the fiber material are coupled to a conductive material.

12. The method of claim 11, wherein the conductive material is a copper tape.

* * * * *